(12) United States Patent
Shenefiel

(10) Patent No.: US 6,857,008 B1
(45) Date of Patent: Feb. 15, 2005

(54) ARRANGEMENT FOR ACCESSING AN IP-BASED MESSAGING SERVER BY TELEPHONE FOR MANAGEMENT OF STORED MESSAGES

(75) Inventor: Chris A. Shenefiel, Oakton, VA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/551,914

(22) Filed: Apr. 19, 2000

(51) Int. Cl.[7] ............................................. G06F 15/16
(52) U.S. Cl. ..................... 709/219; 709/203; 709/217; 379/88.17; 379/88.01
(58) Field of Search ......................... 709/289; 704/260, 704/270, 271, 275; 379/88, 67; 370/352

(56) References Cited

U.S. PATENT DOCUMENTS

| | | | |
|---|---|---|---|
| 4,837,798 A | | 6/1989 | Cohen et al. |
| 5,915,001 A | * | 6/1999 | Uppaluru ................. 379/88.22 |
| 6,157,705 A | * | 12/2000 | Perrone .................... 379/88.01 |
| 6,167,402 A | * | 12/2000 | Yeager ......................... 707/10 |
| 6,233,318 B1 | * | 5/2001 | Picard et al. ............ 379/88.17 |
| 6,243,676 B1 | * | 6/2001 | Witteman .................... 704/243 |
| 6,298,045 B1 | * | 10/2001 | Pang et al. ................. 370/261 |
| 6,377,570 B1 | * | 4/2002 | Vaziri et al. ................ 370/352 |
| 6,418,199 B1 | * | 7/2002 | Perrone .................... 379/88.01 |
| 6,459,774 B1 | * | 10/2002 | Ball et al. ................... 379/67.1 |
| 6,487,534 B1 | * | 11/2002 | Thelen et al. ............... 704/270 |
| 6,507,817 B1 | * | 1/2003 | Wolfe et al. ................. 704/260 |
| 6,526,413 B2 | * | 2/2003 | Schwitters et al. ......... 707/100 |
| 6,628,644 B1 | * | 9/2003 | Nelson et al. .............. 370/352 |

OTHER PUBLICATIONS

Sims, "Standards Update: The Voice Browser", Oreilly Network, Mar. 22, 2000, 4 pages.
Cox, "Allowing The Web To Be Heard", Network World Fusion, Apr. 24, 2000, 2 pages.

* cited by examiner

Primary Examiner—David Wiley
Assistant Examiner—Phuoc H. Nguyen
(74) Attorney, Agent, or Firm—Leon R. Turkevich

(57) ABSTRACT

An arrangement for accessing messages in an IMAP message store via telephone using a unified web-based voice messaging system as an e-mail client for the IMAP message store. The unified Web-based voice messaging system includes a browser configured for generating an audio file that stores received voice signals specifying a messaging operation, and an application server. The application server is configured for outputting an HTML page in response to a user request via the HTTP connection, the HTML page having an XML element that defines data for an audio operation to be performed by an executable audio resource within a web browser or a proxy browser. The application server includes a speech recognition process configured for identifying the messaging operation by interpreting the audio file. Upon identifying the messaging operation and associated operand, the application server outputs a function call for the identified messaging operation to the IMAP message store. The application server also includes text to speech capabilities, enabling an e-mail message or fax message to be converted to an audible format for playback by the browser for the telephony user. Hence, a telephony user can access and manage voice, e-mail, or fax messages stored on the IMAP message store.

15 Claims, 4 Drawing Sheets

ARRANGEMENT FOR ACCESSING AN IP-BASED MESSAGING SERVER BY TELEPHONE FOR MANAGEMENT OF STORED MESSAGES

BACKGROUND OF THE INVENTION

1. Field of the Invention

The present invention relates to unified voice messaging systems enabling voice, fax, and e-mail messages to be retrieved via a telephone.

2. Description of the Related Art

The evolution of the public switched telephone network has resulted in a variety of voice applications services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

A particular concern involves existing voice messaging systems, where voice mail storage is highly restricted in both function and capacity due to limited voice mail system features implemented by switch vendors. In particular, all voice and fax messages are typically held in a single inbox, and are categorized based on whether the user has listened to the messages; hence, voice mail users are forced to keep their messages in a single inbox. In contrast, existing e-mail clients executed by computers enable users to store and manage e-mail messages in multiple folders that are customized by the users. Hence, existing voice mail messaging systems designed and implemented according to the conventional public switched telephone network paradigm are highly restricted in the availability of advanced voice mail system features.

An open standards-based Internet protocol (IP) network, such as the World Wide Web, the Internet, or a corporate intranet, has provided dramatically-improved client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities. In the case of services such as electronic mail, the Internet Message Access Protocol (IMAP) enables clients to access electronic mail or bulletin board messages that are kept on a mail server, such as a shared server. Hence, a client e-mail program can access and manage e-mail messages stored on a remote IMAP server from a desktop computer at home, a workstation at the office, or a notebook computer while traveling, without the need to transfer messages or files back and forth between these computers.

Commonly-assigned, copending application Ser. No. 09/480,485, filed Jan. 11, 2000, entitled Application Server Configured for Dynamically Generating Web Pages for Voice Enabled Web Applications, the disclosure of which is incorporated in its entirely herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource, such as an IMAP message store. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

SUMMARY OF THE INVENTION

There is a need for an arrangement that enables telephone users to access server-based messages, such as e-mail, voice mail, and faxes, without the necessity of an e-mail client.

There is also a need for an arrangement that enables telephone users to organize messages stored on a message server, including storing messages in selected folders, retrieving messages from selected folders, and to search messages within folders.

These and other needs are attained by the present invention, where a unified messaging platform is configured for interpreting voice signals specifying a messaging operation, and generating a function call specifying the messaging operation to a messaging server according to IP protocol.

One aspect of the present invention provides a method by an application server for accessing a messaging server. The method includes receiving, from a browser configured for dynamic control of audio operations, an HTTP request having an audio file that stores received voice signals specifying a messaging operation, identifying the messaging operation in the application server by interpreting the audio file, and outputting a function call specifying the messaging operation to the messaging server according to IP protocol. Identification of the messaging operation by the application server interpreting the audio file enables the application server to generate the corresponding function call to the messaging server. Hence, use of the browser and application server provides unified messaging capabilities, enabling the user to access and manage messages in an IMAP type messaging server merely by using an audio input device, such as a telephone.

Another aspect of the present invention provides a system configured for accessing a messaging server. The system includes an HTTP interface configured for receiving an HTTP request from a browser configured for dynamic control of audio operations. The HTTP request has an audio file that stores voice signals received by the browser from a user input device and specifies a messaging operation. The application server also includes an executable application runtime environment configured for generating for the browser an HTML page having media content information and media control information in response to the HTTP request. The executable application runtime environment is configured for outputting a selected function call specifying the messaging operation to the messaging server according to a prescribed messaging protocol.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
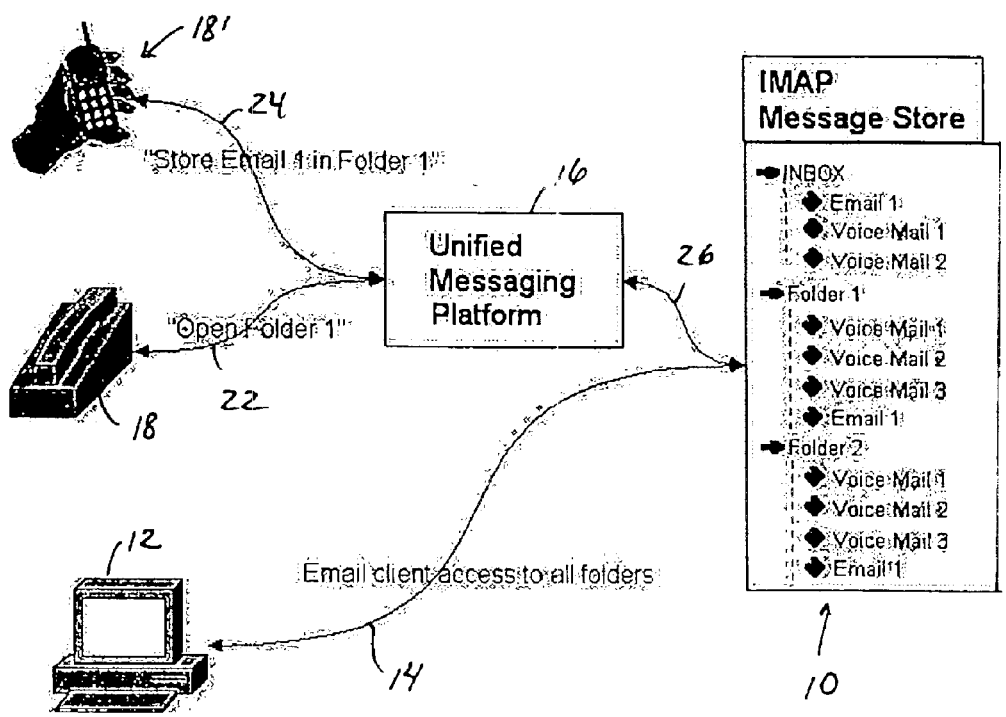
FIG. 1 is a diagram illustrating accessing an IMAP-type messaging server by a telephone according to an embodiment of the present invention.

FIG. 1 is a diagram illustrating the arrangement for accessing an IMAP message server 10 via telephone according to an embodiment of the present invention. Typically access to the IMAP message server 10 has been performed by an e-mail client 12, implemented on a personal computer, that accesses the IMAP message server across an IP-based link 14 established by a local or wide area network.

The Internet Message Access Protocol, Version 4rev1 (IMAP4rev1) is configured to allow the client 12 to access and manipulate electronic mail messages on the server 10. The IMAP4rev1 protocol permits manipulation of remote message folders, called "mailboxes", including operations for creating, deleting, and renaming mailboxes. The IMAP4rev1 protocol also includes operations for checking for new messages, permanently removing messages, setting and clearing flags, parsing, searching, and selective fetching of messaging attributes.

According to the disclosed embodiment, a unified messaging platform 16 enables users to access both e-mail and voice mail messages from the IMAP message 10 store using telephony type input devices such as an analog telephone 18 or a cellular telephone 18'. In particular, the unified messaging platform 16 is configured for receiving voice signals from the input devices 18 or 18', across the respective communications links 22 and 24. For example, the link 22 may be implemented by a public switched telephone network configured for transporting analog voice signals, where the unified messaging platform 16 would include an interface, described below as a proxy browser, that serves as a front end for the unified messaging platform 16 for a telephony interface device (e.g., a PBX) in communication with the input device 18. Similarly, the link 24 may be implemented as a digital cellular telephone network, where the proxy browser of the unified message platform 16 interfaces with a mobile telephone switching office (MTSO) of a digital cellular telephone network.

The unified messaging platform 16 is configured for identifying from the voice signals the messaging operation to be performed, and outputting a function call specifying the messaging operation to be performed to the IMAP message store 10 via an IP link 26. Hence, the unified messaging platform 16 serves as an e-mail client accessing the IMAP message store 10. Moreover, the unified messaging platform 16 is configured for storing voice messages as .wav files, enabling the IMAP message store 10 to be used as a unified messaging server for storage of the mail messages, as well as voice messages as .wav files. In addition, the unified messaging platform 16 includes speech recognition and text to speech capabilities, enabling a user to have e-mail or fax messages stored in the IMAP message converted into an audible format, enabling the user of the telephony type devices 18 to listen to the playback of the e-mail or fax messages.

The unified messaging platform 16 also enables the user of the telephony devices 18 to manage his or her messages by specifying messaging operations. The messaging operations are identified by the unified messaging platform 16, enabling the storage, transfer, or deletion of a voice mail message or an e-mail message specified by the user in a message folder specified by the user.

Hence, users can retrieve messages (e.g., voice mail, e-mail, or fax messages) that are stored in directories on the IMAP message server 10 using a telephony interface. If desired, users can continue to manipulate messages in the IMAP message store 10 using their conventional e-mail client 12. Hence, the disclosed arrangement is particularly beneficial for users to do not have ready access to their e-mail client, or who prefer telephony based message management.

Figure 2:
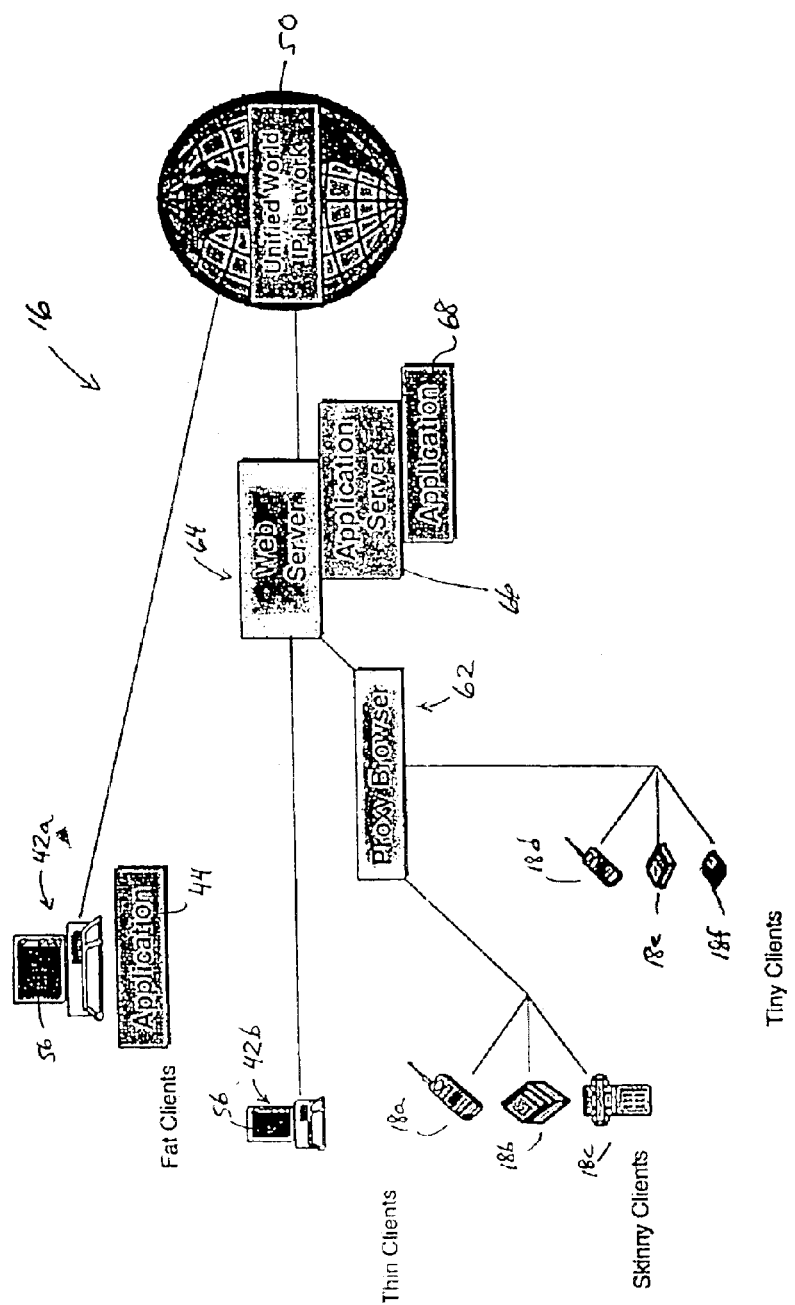
FIG. 2 is a block diagram illustrating the unified messaging platform of FIG. 1 configured for enabling access and management of messages stored on an IP-based messaging server by a telephone according to an embodiment of the present invention.

FIG. 2 is a block diagram illustrating in further detail an architecture enabling access by a telephone to a message store using the unified messaging platform 16, configured for providing voice and data services via an IP network using browser audio control according to an embodiment of the present invention, reproduced from the above-incorporated application Ser. No. 09/480,485. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is the e-mail application 12 of FIG. 1 that knows how to run the application 44 and knows how to run the IP protocols to communicate directly with the messaging server 10 via the packet switched network 50 supporting the link 14. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 2, each of the clients (tiny clients, skinny clients, thin clients and fat clients) are able to communicate via a single, unified architecture 16 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 8b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the unified voice messaging services in the unified network 16 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 16.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications 68. For example, the web server 64 may access the application server 66 across a common Gateway Interface (CGI), by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages (i.e., pages that define an application) and in response generate new XML pages during runtime and supply the generated XML pages to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session.

Figure 3:
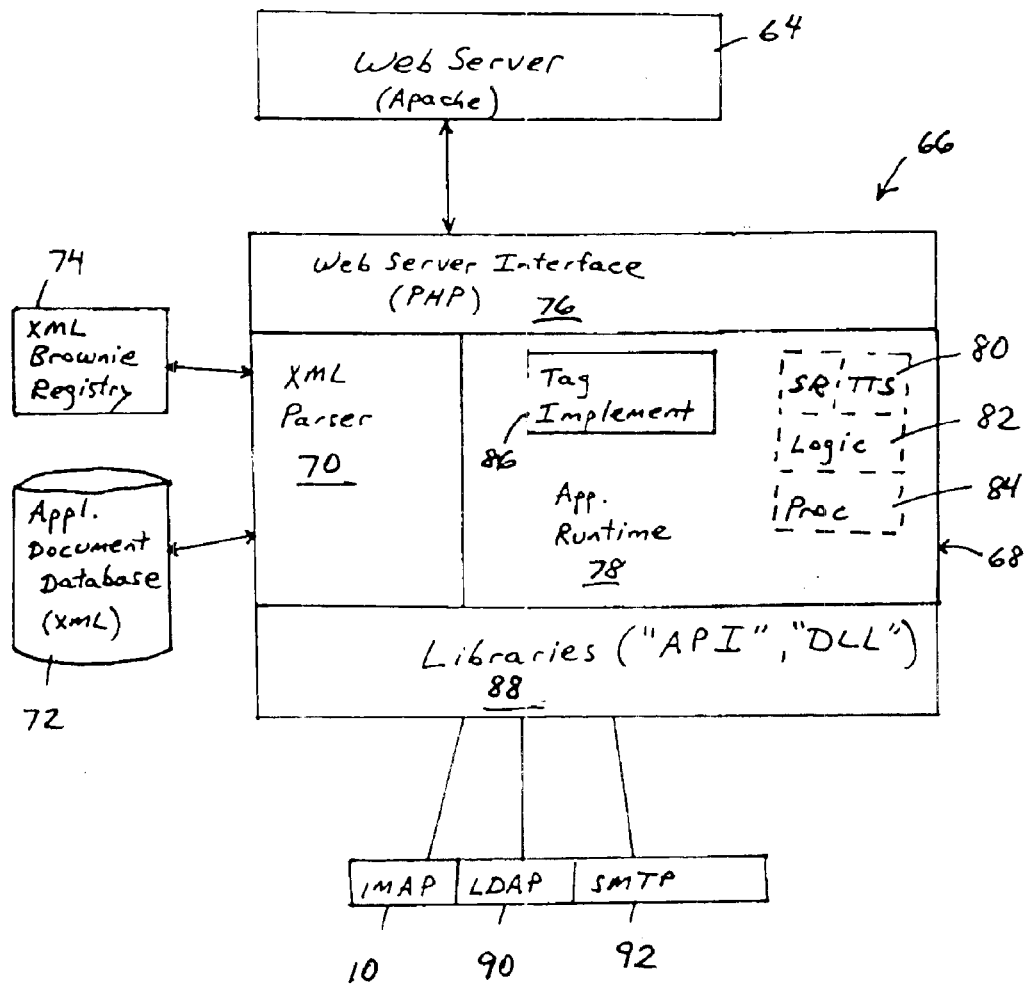
FIG. 3 is a diagram illustrating the voice-enabled application server of FIG. 2.

FIG. 3 is a diagram illustrating in detail the application server 66 according to an embodiment of the present invention. The application server 66 is implemented as a server executing a PHP hypertext processor with XML parsing and processing capabilities, available open source on the World Wide Web at http://www.php.net. As shown in FIG. 3, the server system 66 includes an XML parser 70 configured for parsing the application-defining XML documents stored in the XML document database 72, or the XML documents (i.e., "brownies") stored in the registry 74 and configured for specifying the state and attributes for respective user sessions. The application server 66 also includes a high speed interface 76 that establishes a high-speed connection between the application server 66 and the web server 64. For example, the PHP hypertext processor includes a high-speed interface for Apache Web servers.

The application server 66 also includes a runtime environment 78 for execution of the parsed XML documents. The runtime environment 78 may selectively execute any one of user interface operation 80, a logic operation 82, or a procedure call 84 as specified by the parsed XML document. In particular, the application runtime environment 78 includes a tag implementation module 86 that implements the XML tags parsed by the XML parser 70. The tag implementation module 86 performs relatively low-level operations, for example dynamically generating an XML menu page in response to detecting a menu tag, performing a logical operation in response to a decision tag, or fetching an audio (.wav) file in response to detecting a sound tag. Hence, the tag implementation module 86 implements the tag operations that are specified within the XML framework of the stored XML documents.

The application server 66 also includes a set of libraries 88 that may be implemented as dynamically linked libraries (DLLs) or application programming interface (API) libraries. The libraries 88 enable the runtime environment 78 to implement the procedures 84 as specified by the appropriate XML document. For example, the application server 66 may issue a function call to one of a plurality of IP protocol compliant remote resources 10, 90, or 92 according to IMAP protocol, LDAP Protocol, or SMTP protocol, respectively. For example, the PHP hypertext processor includes executable routines capable of accessing the IMAP or LDAP services. Note that the mechanisms for accessing the services 10, 90, or 92 should be established within the application server before use of XML documents that reference those services.

According to the disclosed embodiment, the user interface services 80 include a speech recognition (SR) process and a text to speech (TTS) process for converting between the voice-based communications by the user of a telephony input device and the text-based data format of messages stored in the IMAP message store 10. In particular, the speech recognition process is configured for identifying a messaging operation and associated operands (e.g., selected messaging folder, selected message) by interpreting an audio (.wav) file supplied by the proxy browser 62 during recording of a user's voice signals specifying a messaging operation. The text to speech process is configured for converting text-based messages such as e-mail messages or facsimile messages stored in the IMAP message store into an audio (.wav) file to be sent in an HTML page for playback by the proxy browser 62 for the user of the telephony device 18. Additional details of the application server 66 and the corresponding interactions between the browsers 56 and 62 are disclosed in the above-incorporated application Ser. No. 09/480,485.

Figure 4:
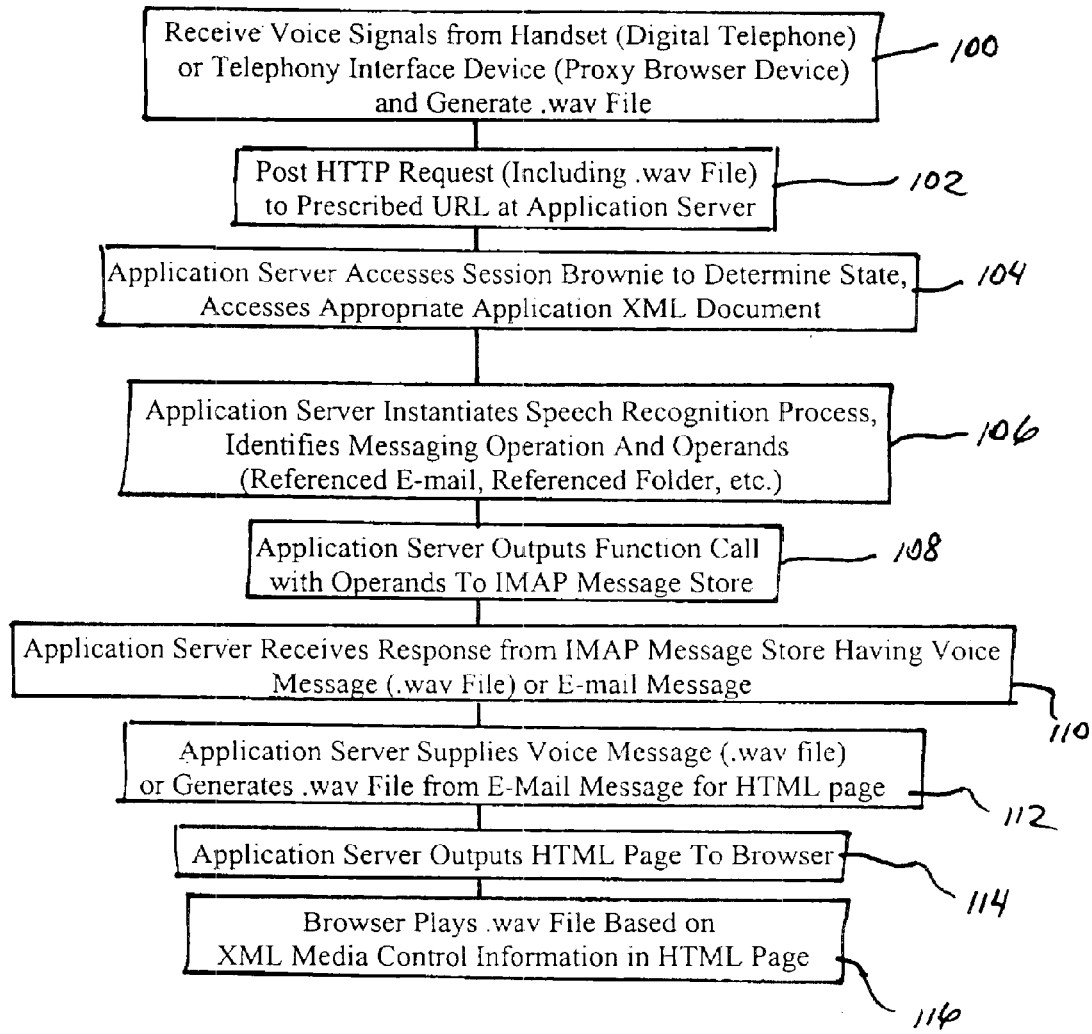
FIG. 4 is a flow diagram illustrating the method of accessing an IMAP-type messaging server by a telephone according to an embodiment of the present invention.

FIG. 4 is a diagram illustrating the method of accessing an IMAP based messaging server 10 using a telephony device 18 according to an embodiment of the present invention. The steps described in FIG. 4 can be implemented as computer code that is stored on a computer readable medium (e.g., a hard disk drive, a floppy drive, a random access memory, a read only memory, an EPROM, a compact disk, etc). The method begins in step 100, where a browser (56 or 62) receives voice signals and generates an audio (.wav) file. For example, the browser 56 may be implemented in a digital telephone, or alternatively the proxy browser 62 may interface with a telephony interface device for recording of the voice signals. As described above, the recording operation by the browser 56 or 62 is controlled by XML media control tags supplied in an HTML page from the application server 66. Hence, the browser 56 or 62 would typically initiate recording after playing a prompt for the user.

The browser 56 or 62 then posts in step 102 an HTTP request, including the recorded .wav file carrying the voice signals specifying the messaging operation, to the application server 66 at a prescribed URL specified by the previously-supplied HTML page. In response to receiving the HTTP request, the application server 66 in step 104 accesses a stored XML document ("brownie") from the registry 74 in order to determine the session state with the user specified in the HTTP request, and accesses the appropriate application XML document based on the URL and the determined session state from the accessed brownie. The XML parser 70 parses the accessed application XML document, and in response to determining that the accessed application XML document includes an XML tag (i.e., voice command identifier) that specifies performing an IMAP operation based on supplied user speech information, the application runtime environment 78 instantiates in step 106 the speech recognition process from the user interface services 80 and identifies from the supplied audio (.wav) file the specified messaging operation and any specified operands, including a reference to folder, a reference e-mail, etc. The application runtime environment 78 than selects the appropriate function call from the library 88, and outputs the IMAP function call in step 108 to the IMAP message store 10.

The IMAP message store 10 performs the appropriate messaging operation in response to receiving the IMAP function call in step 108 (e.g., store a message in a selected folder, retrieve a message from a selected folder, delete a message from a selected folder, or create, modify, or delete a selected folder, etc.) and returns a result back to the application server 66.

The application server 66 receives the response back from the IMAP message store 10 in step 110. Typically the response will include a requested voice message in the form of a .wav file, or an e-mail message. Alternately, the response may include an acknowledgment or denial as to whether a requested operation (e.g., create, modify or delete a folder) has been performed. The application server 66 in step 112 utilizes the text to speech converter in the user interface services 80 to convert an e-mail message into a .wav file that can be played for the telephony device 18; if the IMAP message store 10 has forwarded a .wav file, the application server 66 merely supplies the .wav file as part of the dynamically generated HTML page. The application server 66 then outputs the generated HTML page including the .wav file to the browser 56 or 62 in step 114, updates the corresponding brownie, and terminates the executable process in the runtime environment 78.

The browser (e.g., the proxy browser 62), upon receiving the HTML page, determines the capabilities for the corresponding input device 18. In this case, the proxy browser 62 determines that the input device 18 is a telephony device capable of receiving audio signals, and plays in step 116 the .wav file in the HTML page based on XML media tag control information within the HTML page. In particular, the XML media tag control information enables the proxy browser 62 to play multiple .wav files in a prescribed order, providing for the user the perception of playing the message (voice mail message, e-mail, or fax), followed by a prompt-based menu allowing the user to decide whether to continue with other options or whether to exit from the messaging system.

According to the disclosed embodiment, voice, e-mail, and fax messages stored on an IMAP server can be stored using folders controlled by telephone users. Hence, unified message users can retrieve messages using their telephones.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an application server for accessing a messaging server, the method comprising:

receiving, from a browser configured for dynamic control of audio operations, an HTTP request having an audio file that stores received voice signals specifying a messaging operation;

identifying the messaging operation in the application server by interpreting the audio file; and outputting a function call specifying the messaging operation to the messaging server according to IP protocol, wherein the step of interpreting the audio file includes:

executing a speech recognition process based on a voice command identifier specified in the HTTP request; and identifying by the speech recognition process the corresponding messaging operation and a corresponding operand from the audio file, wherein the outputting step includes selecting the function call based on the identified messaging operation, and supplying with the function call the corresponding operand, the method further comprising:

receiving from the messaging server a response to the function call that specifies a stored message; and sending an HTML page to the browser for playback of a second audio file representing the stored message;

wherein the step of identifying the corresponding messaging operation and the corresponding operand includes identifying a messaging folder specified by the operand; and the step of outputting the function call includes specifying the message folder within the operand with the corresponding function call, wherein the step of receiving from the messaging server a response includes receiving the stored message as one of an e-mail message and a voice mail message recorded on a stored audio file from the specified messaging folder within the messaging server, the method further comprising:

selectively generating the second audio file by the application server based on determining that the stored message is an e-mail message; and selectively supplying the stored audio file as the second audio file based on determining that the stored message is the voice mail message recorded on the stored audio file.

2. The method of claim 1, wherein the outputting step includes outputting the function call according to IMAP protocol.

3. A method in an application server for accessing a messaging server, the method comprising:

receiving, from a browser configured for dynamic control of audio operations, an HTTP request having an audio file that stores received voice signals specifying a messaging operation;

identifying the messaging operation in the application server by interpreting the audio file; and outputting a function call specifying the messaging operation to the messaging server according to IP protocol, wherein the step of interpreting the audio file includes:

executing a speech recognition process based on a voice command identifier specified in the HTTP request; and identifying by the speech recognition process the corresponding messaging operation and a corresponding operand from the audio file, wherein the step of identifying the corresponding messaging operation and the corresponding operand includes identifying a messaging folder specified by the operand; and the step of outputting the function call includes specifying the message folder within the operand with the corresponding function call, wherein the step of identifying the corresponding messaging operation further includes identifying the messaging operation as one of opening the identified message folder, storing into the identified message folder a message specified by the audio file, and deleting from the identified message folder the message specified by the audio file.

4. A method in an application server for accessing a messaging server, the method comprising:

receiving, from a browser configured for dynamic control of audio operations, an HTTP request having an audio file that stores received voice signals specifying a messaging operation;

identifying the messaging operation in the application server by interpreting the audio file; and outputting a function call specifying the messaging operation to the messaging server according to IP protocol, wherein the step of interpreting the audio file includes:

executing a speech recognition process based on a voice command identifier specified in the HTTP request; and identifying by the speech recognition process the corresponding messaging operation and a corresponding operand from the audio file, wherein the step of identifying the corresponding messaging operation and the corresponding operand includes identifying a messaging folder specified by the operand; and the step of outputting the function call includes specifying the message folder within the operand with the corresponding function call, wherein the step of identifying the corresponding messaging operation further includes identifying the messaging operation as one of creating the identified message folder, and deleting the identified message folder.

5. An application server configured for accessing a messaging server, the system comprising:

an HTTP interface configured for receiving an HTTP request from a browser configured for dynamic control of audio operations, the HTTP request having an audio file that stores voice signals received by the browser from a user input device and specifying a messaging operation; and an executable application runtime environment configured for generating for the browser an HTML page having media content information and associated media control information in response to the HTTP request, the executable application runtime environment configured for outputting a selected function call specifying the messaging operation to the messaging server according to a prescribed messaging protocol, wherein the media control information identifies a message folder and the application runtime environment is configure for one of: creating the identified message folder, opening the identified message folder, storing into the identified message folder a message specified by the audio file, deleting from the identified message folder the message specified by the audio file, and deleting the identified message folder.

6. The server of claim 5, wherein the executable application runtime environment includes:

a speech recognition process configured for identifying the messaging operation from the audio file; and a text-to-speech process configured for converting text-based messages received from the messaging server to a second audio file to be sent in the HTML page for playback by the browser to the user of the user input device.

7. The server of claim 6, wherein the executable application runtime environment executes the speech recognition process based on a voice command identifier parsed based on a determined application state of the user.

8. An application server configured for accessing a messaging server, the system comprising:

an HTTP interface configured for receiving an HTTP request from a browser configured for dynamic control of audio operations, the HTTP request having an audio file that stores voice signals received by the browser from a user input device and specifying a messaging operation; and means for generating for the browser an HTML page having media content information and associated media control information in response to the HTTP request, the generating means configured for outputting a selected function call specifying the messaging operation to the messaging server according to a prescribed messaging protocol, wherein the media control information identifies a message folder and the generating means is configured for one of: creating the identified message folder, opening the identified message folder, storing into the identified message folder a message specified by the audio file, deleting from the identified message folder the message specified by the audio file, and deleting the identified message folder.

9. The server of claim 8, wherein the generating means includes:
   means for identifying the messaging operation from the audio file; and
   means for converting text-based messages received from the messaging server to a second audio file to be sent in the HTML page for playback by the browser to the user of the user input device.

10. The server of claim 9, wherein generating means initiates execution of the identifying means based on a voice command identifier parsed based on a determined application state of the user.

11. The server of claim 10, wherein the voice command identifier is specified by an XML tag parsed by the generating means.

12. A computer readable medium having stored thereon sequences of instructions for accessing a messaging server, the sequences of instructions including instructions for performing the steps of:
   receiving, from a browser configured for dynamic control of audio operations, an HTTP request having an audio file that stores received voice signals specifying a messaging operation;
   identifying the messaging operation in the application server by interpreting the audio file; and
   outputting a function call specifying the messaging operation to the messaging server according to IP protocol,
   wherein the step of interpreting the audio file includes:
   executing a speech recognition process based on a voice command identifier specified in the HTTP request; and
   identifying by the speech recognition process the corresponding messaging operation and a corresponding operand from the audio file,
   wherein the outputting step includes selecting the function call based on the identified messaging operation, and supplying with the function call the corresponding operand;
   the method further comprising instructions for performing the step of:
   receiving from the messaging server a response to the function call that specifies a stored message; and
   sending an HTML page to the browser for playback of a second audio file representing the stored message,
   wherein the step of identifying the corresponding messaging operation and the corresponding operand includes identifying a messaging folder specified by the operand; and the step of outputting the function call includes specifying the message folder within the operand with the corresponding function call, wherein the step of receiving from the messaging server a response includes receiving the stored message as one of an e-mail message and a voice mail message recorded on a stored audio file from the specified messaging folder within the messaging server, the medium further comprising instructions for performing the steps of:
   selectively generating the second audio file by the application server based on determining that the stored message is an e-mail message; and
   selectively supplying the stored audio file as the second audio file based on determining that the stored message is the voice mail message recorded on the stored audio file.

13. The medium of claim 12, wherein the outputting step includes outputting the function call according to IMAP protocol.

14. A computer readable medium having stored thereon sequences of instructions for accessing a messaging server, the sequences of instructions including instructions for performing the steps of:
   receiving, from a browser configured for dynamic control of audio operations, an HTTP request having an audio file that stores received voice signals specifying a messaging operation;
   identifying the messaging operation in the application server by interpreting the audio file; and
   outputting a function call specifying the messaging operation to the messaging server according to IP protocol,
   wherein the step of interpreting the audio file includes:
   executing a speech recognition process based on a voice command identifier specified in the HTTP request; and
   identifying by the speech recognition process the corresponding messaging operation and a corresponding operand from the audio file,
   wherein the step of identifying the corresponding messaging operation and the corresponding operand includes identifying a messaging folder specified by the operand; and the step of outputting the function call includes specifying the message folder within the operand with the corresponding function call,
   wherein the step of identifying the corresponding messaging operation further includes identifying the messaging operation as one of opening the identified message folder, storing into the identified message folder a message specified by the audio file, and deleting from the identified message folder the message specified by the audio file.

15. A computer readable medium having stored thereon sequences of instructions for accessing a messaging server, the sequences of instructions including instructions for performing the steps of:
   receiving, from a browser configured for dynamic control of audio operations, an HTTP request having an audio file that stores received voice signals specifying a messaging operation;
   identifying the messaging operation in the application server by interpreting the audio file; and
   outputting a function call specifying the messaging operation to the messaging server according to IP protocol,
   wherein the step of interpreting the audio file includes:
   executing a speech recognition process based on a voice command identifier specified in the HTTP request; and
   identifying by the speech recognition process the corresponding messaging operation and a corresponding operand from the audio file,
   wherein the step of identifying the corresponding messaging operation and the corresponding operand includes identifying a messaging folder specified by the operand; and the step of outputting the function call includes specifying the message folder within the operand with the corresponding function call,
   wherein the step of identifying the corresponding messaging operation further includes identifying the messaging operation as one of creating the identified message folder, and deleting the identified message folder.

* * * * *